Patented Apr. 25, 1944

2,347,636

UNITED STATES PATENT OFFICE 2,347,636

RECOVERY OF UNSATURATED ALDEHYDES

Le Roy U. Spence, Elkins Park, and Frederick W. Robinson, Philadelphia, Pa., assignors to Röhm & Haas Company, Philadelphia, Pa., a corporation of Delaware No Drawing. Application June 24, 1941, Serial No. 399,534

8 Claims. (Cl. 260—603)

The present invention relates to the recovery of unsaturated aldehydes resulting from the catalytic oxidation of unsaturated alcohols.

It is known that unsaturated alcohols such as allyl and methallyl alcohols may be converted to the unsaturated aldehydes by reacting the unsaturated alcohols with air in the presence of catalysts, such as copper or silver, at temperatures of the order of from 300° C. to 550° C. There results from this reaction a gaseous mixture containing chiefly water, unchanged alcohol, unsaturated aldehyde and nitrogen. The unsaturated alcohols and aldehydes have a rather high vapor pressure at room temperature and cooling to a low temperature is usually resorted to in order to recover the products, whereupon such products may then be separated by distillation.

In the preparation of unsaturated aldehydes as above outlined, we have found that when the unsaturated aldehydes are allowed to stand or are heated in the presence of water, reaction occurs which results in poor recoveries of the desired product. An object of this invention is to provide for the recovery of the unsaturated aldehyde and the unchanged alcohol in improved yield by diminishing the reaction of the unsaturated aldehyde with water. A further object of this invention is to recover the unsaturated aldehyde and alcohol from the inert gases without the need of cooling to low temperatures.

We have found that by contacting the gaseous mixture resulting from catalyzed reactions of the type above referred to with certain high boiling solvents the unsaturated aldehydes and alcohols may be recovered from the non-condensable gases without the need of cooling to low temperatures. The high boiling solvents used dissolve very little or no water, but are good solvents for the unsaturated aldehyde and alcohol, and a two layer system is formed, one of which comprises water which contains little or no unsaturated aldehyde and alcohol. The liquid products may also be condensed by cooling of the exit gases and then treated with the solvent to separate the water from the unsaturated aldehyde and alcohol. The water layer may then be separated from the solvent layer before distillation, whereupon separate distillations of the layers may be effected. By operating in this manner substantially complete recovery of the unsaturated aldehyde and unreacted alcohol from the solvent layer may be accomplished and any small amounts of aldehyde and alcohol in the water layer may also be recovered, with the minimum loss of desired products. Upon separation of solvent from the unsaturated aldehyde and alcohol in the solvent layer, the solvent may be reused.

We prefer to employ solvents boiling above 150° C. Lower boiling solvents, while they may be employed, are less readily separated from the products and are more readily lost by evaporation in the nitrogen from the reaction. Our preferred solvents are selected from the class of alcohols, ketones, and esters boiling above 150° C., and having low solubilities for water. Examples are normal hexyl alcohol, normal heptyl alcohol, cyclohexanol, methyl cyclohexanol, capryl alcohol, methyl hexyl ketone, n-amyl methyl ketone, diisobutyl ketone, dibutyl ketone, ethoxy-ethyl acetate, dimethyl phthalate, dibutyl phthalate, dibutyl sebacate, butyl butyrate, ethyl caproate, and ethyl benzoate.

The vapors from the catalytic reaction are preferably cooled to moderate temperatures, e. g. 25–50° C., and the uncondensed vapors and gas are then passed upwards through a packed tower or bubble plate column, while the fresh solvent is fed to the top of the tower. The condensate from the cooler is mixed with the solvent solution from the scrubber tower so that water is separated from the unsaturated aldehyde as soon as possible.

The following examples further illustrated our invention.

*Example 1*

Acrolein was vaporized in a stream of pure nitrogen and the gas was scrubbed with water at 20° C., vaporized water being collected in a trap at 0° C. The gain in weight of the water absorbers was 95% of the acrolein vaporized, but only 65% of the acrolein was recovered on distillation. Absorption in water at 0° C. gave only 88% recovery of the acrolein on distillation. Absorption of the acrolein in technical capryl alcohol at 20° C., in the presence of 10% water, followed by distillation of the acrolein gave 96% recovery of acrolein.

*Example 2*

Allyl alcohol (229 grams per hour) and air (181 liters per hour) were passed at 390° C. over 200 cc. of a catalyst consisting of silver deposited on pumice. The products were collected by scrubbing with capryl alcohol at 20° C. in a packed tower. The acrolein obtained on distillation of the solvent was 57.8% of theory, and the allyl alcohol recovered brought the yield to 94.2% of theory based on the allyl alcohol consumed.

Example 3

Methallyl alcohol (204 grams per hour), water (51 grams per hour), and air (138 liters per hour) were passed over 200 cc. of silver on pumice at 390° C. and the products were absorbed in methyl hexyl ketone at 20° C. Distillation of the products gave methacrolein equivalent to 72.6% of the methallyl alcohol put in. The methallyl alcohol recovered raised the yield to 90.9% based on the methallyl alcohol consumed.

We claim:

1. In the recovery of unsaturated aldehydes from mixtures containing same in the presence of water, the improvement which comprises extracting the unsaturated aldehydes with a relatively high boiling solvent for the aldehydes, which solvent is at least one member of the group consisting of alcohols, ketones, and esters that are substantially immiscible with water and subsequently separating the components by distillation.

2. In the recovery of unsaturated aldehydes and alcohols from mixtures containing same in the presence of water, the improvement which comprises extracting from the mixture the unsaturated aldehydes and alcohols with a solvent that is a member of the group consisting of alcohols, ketones, and esters which boil above 150° C., and with which water is substantially immiscible and subsequently separating the components by distillation.

3. In the preparation of unsaturated aldehydes from unsaturated alcohols wherein water is formed, the improvement which comprises removing the unsaturated aldehydes and unreacted alcohols from other materials with which they are admixed, by extraction with a solvent that is a member of the group consisting of alcohols, ketones, and esters which boil above 150° C. in which the aldehydes and alcohols are soluble but with which water is substantially immiscible and subsequently separating the components by distillation.

4. In the preparation of unsaturated aldehydes from unsaturated alcohols by passing the alcohol in the presence of air over a catalyst maintained at a relatively high temperature, the improvement which comprises cooling the vapors from the catalytic reaction and bringing them into contact with a solvent that is a member of the group consisting of alcohols, ketones, and esters which boil above 150° C. with which water is immiscible, and thereafter recovering the unsaturated aldehyde and unreacted alcohol from the solvent by distillation.

5. In the preparation of unsaturated aldehydes from unsaturated alcohols by passing the alcohol in the presence of oxygen over a catalyst maintained at a relatively high temperature, the improvement which comprises cooling the vapors from the catalytic reaction and bringing them into contact with a solvent that is a member of the group consisting of alcohols, ketones, and esters which boil above 150° C. with which water is immiscible, and thereafter recovering the unsaturated aldehyde and unreacted alcohol from the solvent by distillation.

6. In the preparation of unsaturated aldehydes from unsaturated alcohols wherein water is formed, the improvement which comprises removing the unsaturated aldehydes and unreacted alcohols from other materials with which they are admixed, by extraction with an alcohol boiling above 150° C. in which the aldehydes and alcohols are soluble but with which water is substantially immiscible and subsequently separating the components by distillation.

7. In the preparation of unsaturated aldehydes from unsaturated alcohols wherein water is formed, the improvement which comprises removing the unsaturated aldehydes and unreacted alcohols from other materials with which they are admixed, by extraction with a ketone boiling above 150° C. in which the aldehydes and alcohols are soluble but with which water is substantially immiscible and subsequently separating the components by distillation.

8. In the preparation of unsaturated aldehydes from unsaturated alcohols wherein water is formed, the improvement which comprises removing the unsaturated aldehydes and unreacted alcohols from other materials with which they are admixed, by extraction with an ester boiling above 150° C. in which the aldehydes and alcohols are soluble but with which water is substantially immiscible and subsequently separating the components by distillation.

LE ROY U. SPENCE.
FREDERICK W. ROBINSON.